US011857862B1

(12) United States Patent
Lombardi Thomas et al.

(10) Patent No.: US 11,857,862 B1
(45) Date of Patent: Jan. 2, 2024

(54) METHOD AND SYSTEM FOR ASSESSING TENNIS STROKE HEAVINESS

(71) Applicants: Lindsey Lombardi Thomas, Pittsburgh, PA (US); Brian M. Thomas, Pittsburgh, PA (US)

(72) Inventors: Lindsey Lombardi Thomas, Pittsburgh, PA (US); Brian M. Thomas, Pittsburgh, PA (US)

( * ) Notice: Subject to any disclaimer, the term of this patent is extended or adjusted under 35 U.S.C. 154(b) by 0 days.

(21) Appl. No.: 18/342,063

(22) Filed: Jun. 27, 2023

Related U.S. Application Data

(60) Provisional application No. 63/479,366, filed on Jan. 11, 2023.

(51) Int. Cl.
*A63B 71/06* (2006.01)
*A63B 69/38* (2006.01)
*A63B 43/00* (2006.01)

(52) U.S. Cl.
CPC ........ *A63B 71/0622* (2013.01); *A63B 43/004* (2013.01); *A63B 69/38* (2013.01); *A63B 2071/0625* (2013.01); *A63B 2214/00* (2020.08); *A63B 2220/05* (2013.01); *A63B 2220/20* (2013.01); *A63B 2220/35* (2013.01); *A63B 2220/62* (2013.01); *A63B 2220/806* (2013.01); *A63B 2220/808* (2013.01); *A63B 2220/89* (2013.01)

(58) Field of Classification Search
CPC ... A63B 71/0622; A63B 43/004; A63B 69/38; A63B 2214/00; A63B 2071/0625; A63B 2220/05; A63B 2220/20; A63B 2220/35; A63B 2220/62; A63B 2220/806; A63B 2220/808; A63B 2220/89

See application file for complete search history.

(56) References Cited

U.S. PATENT DOCUMENTS

| | | | |
|---|---|---|---|
| 7,435,195 B1 * | 10/2008 | Calderon | A63B 69/0075 473/459 |
| 9,731,165 B2 * | 8/2017 | Nomura | A63B 24/0003 |
| 9,851,374 B2 * | 12/2017 | Clark | A63B 71/0619 |
| 10,286,282 B2 * | 5/2019 | Ito | G09B 19/0038 |
| 10,369,446 B2 | 8/2019 | Danis et al. | |
| 10,456,653 B2 * | 10/2019 | Thornbrue | A63B 69/3635 |
| 2006/0252017 A1 * | 11/2006 | Vorozhtsov | A63B 71/0605 434/247 |
| 2008/0293488 A1 * | 11/2008 | Cheng | A63F 13/45 463/31 |
| 2012/0116548 A1 * | 5/2012 | Goree | A61B 5/7253 700/90 |
| 2013/0053190 A1 * | 2/2013 | Mettler | A63B 24/0062 473/422 |
| 2013/0128022 A1 * | 5/2013 | Bose | G06Q 10/0833 348/77 |
| 2015/0057112 A1 * | 2/2015 | Sak | A63B 49/00 473/461 |

(Continued)

*Primary Examiner* — Malina D. Blaise
(74) *Attorney, Agent, or Firm* — Fox Rothschild LLP

(57) ABSTRACT

A method and system for assessing heaviness of a swing in sport of tennis is disclosed. The system may display the calculated heaviness of a groundstroke in real-time. As the player hits ground strokes, the system will measure linear and rotational speed of the ball and calculate a heaviness value based on the physics of translational and rotational kinetic energy of the ball.

19 Claims, 5 Drawing Sheets

(56) References Cited

U.S. PATENT DOCUMENTS

| | | | |
|---|---|---|---|
| 2015/0057777 A1* | 2/2015 | Mace | A63B 71/0619 |
| | | | 700/91 |
| 2015/0105882 A1* | 4/2015 | Clark | A63B 71/0619 |
| | | | 700/91 |
| 2017/0004358 A1* | 1/2017 | Bose | G06Q 10/0639 |
| 2019/0009133 A1* | 1/2019 | Mettler May | G09B 19/0038 |
| 2019/0347956 A1* | 11/2019 | Daga | G16H 40/67 |
| 2022/0187841 A1* | 6/2022 | Ebrahimi Afrouzi | |
| | | | G05D 1/0242 |
| 2023/0222531 A1* | 7/2023 | Cella | G06Q 30/0201 |
| | | | 705/7.31 |

* cited by examiner

METHOD AND SYSTEM FOR ASSESSING TENNIS STROKE HEAVINESS

RELATED APPLICATIONS AND CLAIM OF PRIORITY

This patent document claims priority to U.S. provisional patent application No. 63/479,366, filed Jan. 11, 2023, the disclosure of which is fully incorporated into this document by reference.

BACKGROUND

In the game of tennis, "heaviness" is a term that is sometimes used abstractly to describe the characteristics of perceived pace combined with amount of top spin of a ground stroke. The "heavier" the ball, the more difficult it will be for the opposing player to react to, return, or otherwise manage the ball.

As noted above, "heaviness" is an abstract term and has not been quantified in any specific, measurable way. While it has been described as a descriptor that considers top spin of a shot, along with perceived pace, a ground stroke is neither "heavy" if it is hit very slowly with a significant amount of top spin, nor is it "heavy" if it is hit flat (minimal rotation) but at a high speed.

Methods and systems for training tennis players by helping them analyze and improve their swings are highly desirable.

SUMMARY

This document describes a method and system for providing a cohesive, real-time assessment of "heaviness" of a ground stroke. The methods and systems described in this document can be used to assess the absolute heaviness of a given shot, and/or relative heaviness values when inter- or intra-player comparisons are the goal.

In some embodiments, a heaviness assessment device may be placed on the tennis court, such as a location where a traditional radar gun may be positioned. In addition or in other embodiments, some or all components of the system may be included within a ball. As ground strokes are hit, the system will measure both linear speed (measured in units such as miles per hour) and rotational speed (measured in units such as rotations per minute) and output a measured heaviness value of a ball that has been hit. The system may have the option to store information within a session for a given player, and it may provide the ability for the data to be downloaded for longitudinal comparisons for a given player.

A method and system to quantify heaviness in tennis could have significant utility, more so than the traditionally utilized markers of miles per hour (MPH) and rotations per minute (RPM). The ability to describe the heaviness of a stroke in numbers is a paradigm shift for how one experiences the game of tennis as a player, coach, spectator, and the casual audience. The methods and systems described in this document also may be applied to measure swings in in other racquet, paddle, or bat sports such as cricket, badminton, table tennis, etc., in which a player uses a groundstroke or some other forehand or backhand shot to hit a ball after the ball has bounced off of the ground.

Thus, in some embodiments, a system for assessing a tennis stroke includes a sensor device containing one or more sensors capable of detecting parameters of movement of a tennis ball, a processor, a memory containing programming instructions. The instructions are configured to, when executed, cause the processor to: (a) receive, from the one or more sensors, the detected parameters of movement of the ball; (b) use the detected parameters to measure linear speed and rotational speed of the ball; (c) use the measurements of linear speed and rotational speed to generate a heaviness value for a stroke associated with the movement of the ball; and (d) output the heaviness value via a display or speaker.

In some embodiments, when using the measurements of linear speed and rotational speed to generate the heaviness value, the system may use a function of a translational kinetic energy value and a rotational kinetic energy value of the ball. Optionally, when using the function of translational kinetic energy and rotational kinetic energy of the ball the system may adjust the translational kinetic energy value by a first weighting coefficient, adjust the rotational kinetic energy energy value by a second weighting coefficient, and sum the adjusted translational kinetic energy value and the adjusted rotational kinetic energy value. Also optionally, when generating the heaviness value the system may, in response to also receiving one or more characteristics of a court from which the one or more sensor devices collect data, include the one or more characteristics in the function.

In some embodiments, the system may measure linear speed of the ball by, when the one or more sensors comprise a camera, measuring a distance that the ball has moved in a plurality of subsequent frames captured by the camera and using the measured distance and a frame rate of the camera to determine the linear speed of the ball.

In some embodiments, the one or more sensors may comprise a camera, a radar system, a lidar system or an audio sensor.

Optionally, the one or more sensors may be positioned to detect an area of a tennis court that begins on or before a baseline of the court and extends through and beyond a service line of the court.

Optionally, the one or more sensors comprise a receiver configured to receive signals transmitted by a sensor that is located in the ball. The referenced one or more sensors also may be positioned in the ball, and the ball may include a transmitter that transmits signals to the processor. The sensors may include, for example, a gyroscope, an accelerometer, and/or an intertial measurement unit.

In some embodiments, the system may use detected parameters of movement of an additional ball to generate an additional heaviness value for an additional stroke associated with the movement of the additional ball. If so, the system may associate each ball's heaviness value with a time stamp indicating a time at which the parameters for that ball were captured. Then, when outputting the heaviness values, the system use the time stamps of the heaviness values and time stamps of a video showing the strokes to synchronize the heaviness values with the strokes shown in the video.

Various embodiments include a method that implements any of the above described steps, and/or a computer program product comprising a memory device containing programming instructions that are configured to cause a processor to execute any of the above described steps.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to."

Additional terms that are relevant to this disclosure will be defined at the end of this Detailed Description section.

The game of tennis has evolved from a country estate pastime to one of the most watched and competitive sports of our time (Wilson, E. Love Game. Chicago. The University of Chicago Press. 2016). On the surface, tennis is a statistics heavy sport. However, one of the most influential aspects of the game, a player's ground stroke "heaviness" remains nothing but an observation, rudimentarily and unscientifically assessed. The world's current top men's player, arguably Rafael Nadal, is universally praised for the "heaviness" of his forehand; how his opponents feel the "weight" and "heft" of that shot as it pushes the opponent back and pressures him to hit off balance. It has been reported that his groundstroke speed is approximately average for the men's tour, but the combination of his speed and movement on the ball, known as top spin, produces an impact greater than the sum of its parts. (See Nadal v Medvedev: a tale of two groundstrokes|AO (ausopen.com), published Jan. 30, 2022.)

There are other examples in the opposite direction. For example, it has been reported that Madison Keys strikes the ball hard and flat (her average speed is higher than many on the men's tour) but with insignificant amounts of top spin relative to other top players. (See https://womenstennisblog.com/2022/02/07/most-powerful-womens-forehands/, published Feb. 7, 2022.)

The aforementioned players are extreme examples of the concept that a ground stroke is neither considered to be "heavy" if it is hit very slowly with a significant amount of top spin nor is it considered to be "heavy" if it is hit flat (i.e., with minimal rotation) but at a high speed.

The world is increasingly becoming real-time data dependent, including in sports. Thus, this document describes a method and system for quantifying "heaviness" of a ground stroke. Quantification of "heaviness" in tennis has significant utility, more so than the traditionally utilized markers of miles per hour (MPH) and rotations per minute (RPM) of a hit tennis ball. The quantification is a novel, cohesive real-time assessment of "heaviness" of a ground stroke. The methods and systems described in this document may be used to assess the absolute heaviness of a given shot, and/or relative heaviness values when inter- or intra-player comparisons are the goal.

Figure 1:
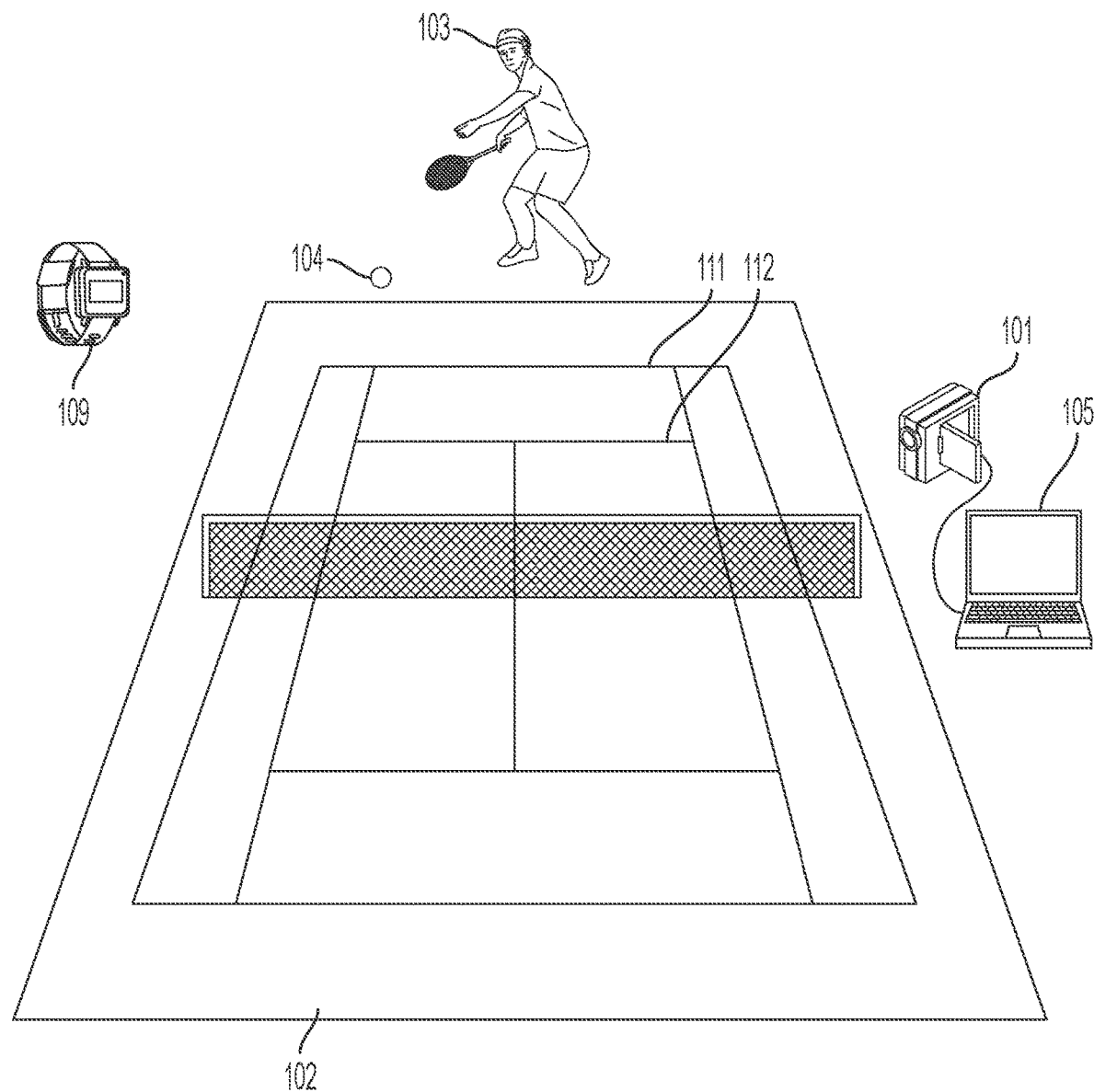
FIG. 1 illustrates an example of a heaviness assessment system positioned near a tennis court, along with other items that will be discussed in the Detailed Description below.

As illustrated in FIG. 1, a heaviness assessment system for a tennis groundstroke includes a court side sensor machine 101 positioned near the sideline, and outside the boundary, of a tennis court 102, in a location such as that where one may locate a courtside radar gun. The size of the device is such that an adult can move it easily between courts. The court side sensor machine 101 includes various sensors that are aimed at the court 102 so that the sensors can detect and measure various parameters of a ball 104 when a player 103 hits the ball on the court. As will be described below, the one or more sensors may be positioned to detect an area of a tennis court that begins on or before the baseline 111 of the court and extends through and beyond the service line 112 of the court. The court side sensor machine includes or is communicatively connected to a computer 105 that processes data captured by the sensors and can output measured heaviness values on a display, via an audio output, or via transmission to a player's electronic device. An example of a player's electronic device 109 is a portable or wearable device such as a smartphone, smart watch, or augmented reality headset that is carried or worn by the player 103.

Figure 2:
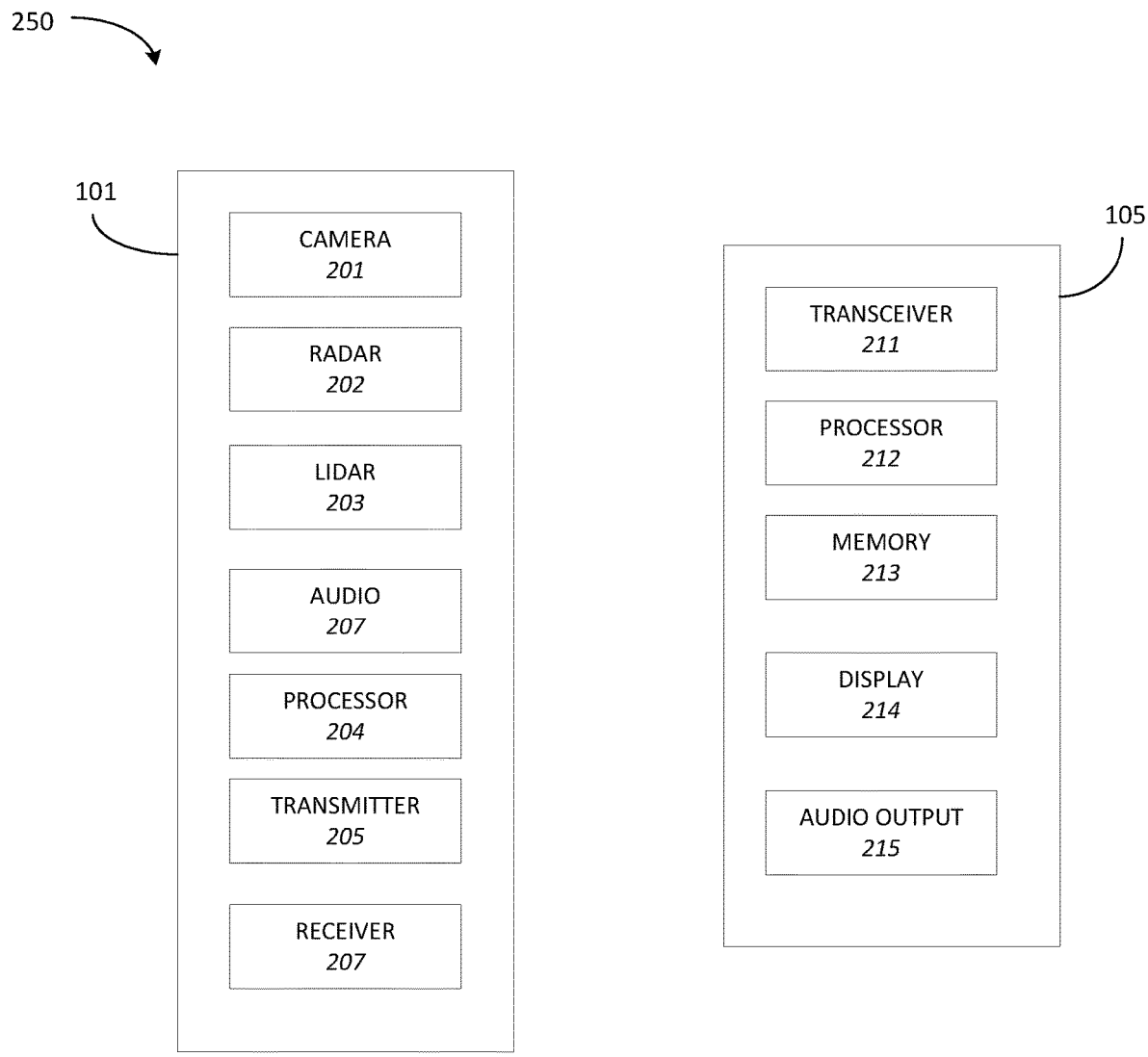
FIG. 2 is a block diagram that illustrates various components of a heaviness assessment system.

FIG. 2 is a block diagram illustrates example features of a heaviness assessment system 250. As noted above, the system includes a court side sensor machine 101 with various sensors positioned to capture data that measures motion of a tennis ball. The sensors may include, for example, a camera 201, a radar system 203, a lidar system 203, microphone or other audio sensor 207 and/or other sensors that capture data about an environment toward which the sensors are positioned.

In some embodiments, if the tennis ball is equipped with various sensors and a signal transmitter, the court side system also may include a receiver that can receive signals from the ball's transmitter. For example, the ball may include a gyroscope, accelerometer, and/or inertial measurement unit (IMU) that is capable of sensing movement and/or rotation of the ball. Examples of such sensors are commercially available at the time of this filing from vendors such as WitMotion Shenzhen Co. Ltd. The ball also may include a radio-frequency (RF), near-field communication (such as Bluetooth), short-range communication, or other transmitter that transmits signals captured by the sensors to the court side sensor machine 101 or other device that is external to the ball. Optionally, the ball may include a processor that processes the data captured by the sensors so that the transmitter sends the processor's output of such processing to the court side sensor machine 101.

In addition, in some embodiments the court side sensor machine 101 may be in communication with an external system that captures data about movement and/or rotation of the ball. If so, the court side sensor machine 101 may receive the data in the form of transmitted messages, or through a direct interface with the external system such as an application programming interface (API).

The court side sensor machine 101 also will include a processor 204 for processing sensed data and a transmitter for transmitting data or post-processing results to an external device. The processor 204 and transmitter 205 may be part of a computing device that is integral with the court side sensor machine. Alternatively, the system 250 may include an additional computing device 105 that includes a transceiver 211 that will receive data from the court side sensor machine. The additional computing device will include a memory 213 with programming instructions that, when executed by a processor 212, will cause the processor 212 to analyze the sensor data to measure the linear speed and rotational speed of the ball. The processor 212 will then use these speed measurements to calculate the heaviness measurement. The processor can output the measured heaviness values on a display 214, via an audio output 215 such as a speaker or audio port, or via transmission to an external device using the transceiver 211.

Figure 3:
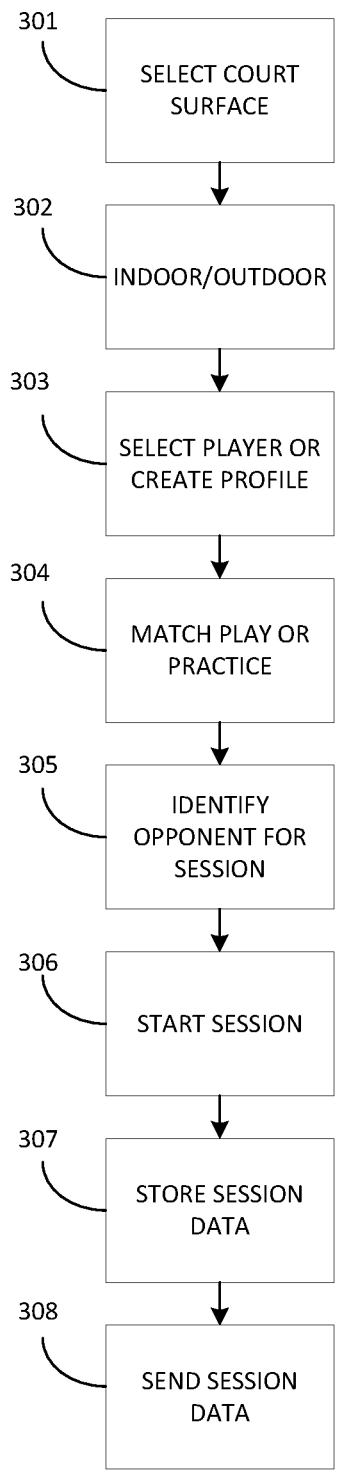
FIG. 3 is diagram illustrating example user inputs via a user interface.

The integral computing device of the court side machine 101, the external computing device 109, and/or the player's electronic device may include a software application that causes the device to provide a user interface via which the player or another user may enter information that the system will use in its calculations, as well as via which the player or another user may view results. For example, referring to FIG. 3, at 301 the user interface may prompt the user to select the court surface (clay, grass, or hardcourt) and (at 302) whether the session is indoors or outdoors. In some embodiments, the system's memory or an external memory may include a database of player profiles, which may store measured data or heaviness value calculations from previous sessions for that player. If so, at 303 the system may prompt the user to create a profile for, or select a profile of, the individual player that the heaviness assessment system will evaluate in the next session.

Optionally, at 304 the user may also be prompted to choose either match mode or practice mode for the session, and (at 305) also to identify the player's opponent for that session. (These data points are for informational purposes, and they may be stored in the player's profile and/or included in a session report when the session is ended and data captured or generated in the session is reported to the player.) Finally, at 306 the user may use the user interface to activate the session and begin to monitor the court for ball movement.

At any time before, during or after the session, the system may prompt the user to to indicate whether or not to store the data 307, and also to provide an identifier of a device or address to which the user would like the system to send its captured and generated data about the session 308. The ordering of the actions shown in FIG. 3 only intended to be an example; the steps shown may be performed in any order. In addition, some steps may be omitted and other steps may be added.

Figure 4:
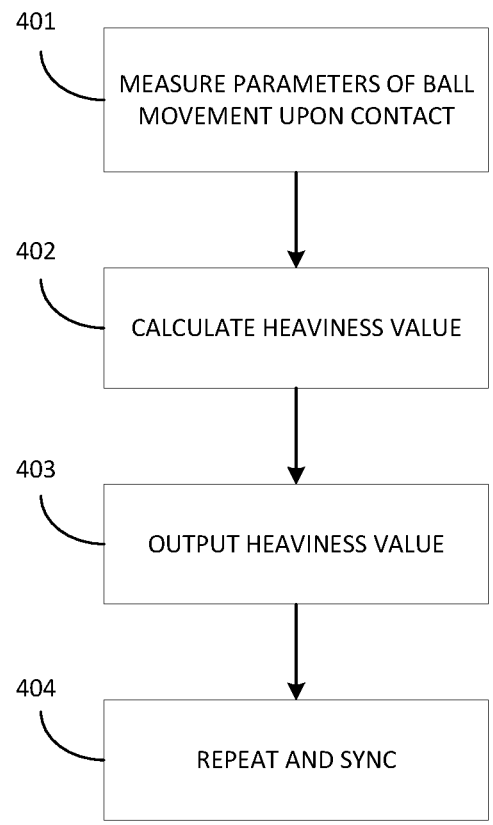
FIG. 4 is an illustration of various steps that a heaviness assessment system may implement.

When used to assess a player's swing during a session, the sensors of the court side system will be positioned, and/or the sensors of the ball will be configured, to capture aspects of the ball's movement in an area through which the ball will travel after the swing. For example, to assess a player's groundstroke, the sensors may be positioned to detect an area that begins on or before the baseline of the court and extends through and beyond the service line of the court. Thus, the sensors can capture and record parameters associated with the ball when it lands in this area. Referring to FIG. 4, as a player hits a ground stroke from the baseline, the sensors of the system detect the ball, and at 401 the processor will use the image data from the sensors (such as radar data and/or a video sequence) to measure the parameters of the ball's movement such as linear speed (in units such as MPH) and rotational speed (in units such as RPM) in real time. To do this, the system may include or have access to a trained object detection model, such as a convolutional neural network (CNN) that has been trained to process information about a scene, detect tennis balls and distinguish tennis balls from other elements of the scene, such as static objects or the ground. Alternatively, or in addition, if the sensor is a camera, the system may use an image processing algorithm such as an edge detection algorithm or a motion detection algorithm to detect and recognize the ball and its movement. Then, the system may process the video frame by frame, measure the distance that the ball moves and/or the amount that the ball rotates in each consecutive frame, and calculate the velocities using the frame rate of the camera. For example, if the frame rate is 25 frames per second and the ball moves 140 cm per frame, the resulting linear velocity of the ball will be:

$$140 \frac{\text{cm}}{\text{frame}} \times 25 \frac{\text{frames}}{\text{sec}} \times \frac{\text{m}}{100 \text{ cm}} = 35 \frac{\text{m}}{\text{sec}}$$

Other methods may be used to detect the ball and measure its linear and rotational velocity. For example, the sensors of the system may include microphones or other audio sensors that capture sounds associated with the ball being hit by the player's racket and/or the ball bouncing off of the court.

At 402, the system will then perform a calculation to determine a heaviness value for the swing based on the physics of translational and rotational kinetic energy, moment of inertia of the ball, the mass of the ball, court surface, and whether the court is indoor or outdoor. The calculations may be based on the physics of translational and rotational kinetic energy as appropriate. (See Brody, Phys. Teach 1984; 22:494-497; Brody H. Phys Teach 2005; 43:503-5; see also Brody, Cross, and Lindsey, The Physics and Technology of Tennis, Racquet Tech Publishing, 2004.) while accounting for the court surface.

For example, the system may use a calculation such as:

Estimated heaviness value=[(weighting coefficient translational)($KE_T$)]+[(weighting coefficient rotational)$KE_R$)](court surface adjustment factor)

where:
translational kinetic energy ($KE_T$)=½(ball mass bmass) (linear velocity $V_L$)$^2$,
rotational kinetic energy ($KE_R$)=½(moment of inertia) (angular velocity $V_A$)$^2$,
$V_L$ is the ball's linear velocity as measured by the sensors (in m/s),
$V_A$ is the ball's angular velocity as measured by the sensors (in m/s),
bmass is expected mass of the ball (such as 0.0577 kg, +/−6.07%),
the weighting coefficient translational is, for example, 0.8 (range: 0.5-1.1),
the weighting coefficient rotational is, for example, 1.2 (range: 0.9-2),
the court surface adjustment factor depends on the type of court surface (examples: hard court=1.0 or any value from 0.85 to 1.2; clay court=1.1 or any value from 0.9-1.3; grass court=0.9 or any value from 0.7-1.1), and moment of inertia is 0.000032 kg×m$^2$ If different units of measure are used, different weighting coefficients may be used in the calculation. Variations of this calculation are also included in the scope of the invention.

The process of steps 401 and 402 may be repeated for each ball-to-racquet contact that the sensors detect. Ultimately, at 403 the heaviness value or values will be displayed on an output display, audibly presented, or otherwise presented to a user. The heaviness value may be output as an absolute number without units, or with a unit label that may be predefined or arbitrarily selected.

Heaviness of a player's groundstroke can be measured as a multiple axis rotational amplitude change (i.e. RPM increase) evident on the continuous real-time monitoring by the IMU or other sensors, and coupled with the multiple axis forward acceleration data that correlates with a given amplitude change. Within the continuous real-time data measurement, the independent factors of air friction, humidity, temperature, altitude, court surface are implicitly controlled/ adjusted for on their impact of the dependent variable of heaviness. Each heaviness factor calculation has its own implicit variation that the system may captured and expressly or implicitly include into the heaviness factor function, which can account for the Magnus Effect. The heaviness factor can be captured in the instant before the groundstroke ball strikes the opposing players racquet. The instant before the opposing player's racquet strikes the ball may be evident in continuous real-time data as the strike of the ball will create an amplitude and acceleration 'jump' which will visually be demarcated on the output screen as peaks and troughs of amplitude (x axis is time, y axis is amplitude with acceleration overlaid for example).

The output heaviness value will be an estimate for the "heaviness" of the ball based on an approximation of joules of energy. The heaviness value will be assessed for the portion of the player's stroke that occurs in the interval after the ball makes contact with the opponent's side of the court (beyond the service line) and prior to collision with the opposing player's racquet.

The real-time heaviness value estimate will be presented to the user as described above. For example, the value may be displayed on an output dashboard on a display of the device. The device may have a WiFi and/or BlueTooth transmitter that can deliver data to an external device (such as a smartphone, a tablet, another external computer, a cloud-based system, a press box data analysis system, etc.) The data may be available in raw and complied form for stroke analysis within session and between sessions. The system may prompt the user to select a type of stroke before or after recording (such as forehand or backhand, or the system may use a trained artificial intelligence model to analyze video of the stroke and classify the detected stroke type. If the system knows the stroke type through any of these or other methods, the system may separate the resulting data by stroke type. Metrics available for multiple strokes of a player may include, but are not limited to, average or mean linear speed (such as in MPH), average or mean rotational speed (such as in RPM), average heaviness value with Standard Deviation (SD), highest heaviness value, and/or median heaviness value with Interquartile Range (IQR). The data may be used at the discretion of the player, coach, or sport commentator to synthesize match strategies, compare players, compare within player improvement, and as a training tool. FIG. 4 contains additional disclosure of the steps and elements listed above.

Optionally, at 404 if multiple heaviness values are captured over a period of time during which the system also captured video of the player's swings, the system may associate each calculated heaviness value with a time stamp. Then, when outputting the heaviness value, the system may use the time stamps to synchronize each heaviness value with the corresponding time-stamps of various frames of the video and present the heaviness values for each stroke along with the corresponding frames of the video for that stroke.

Figure 5:
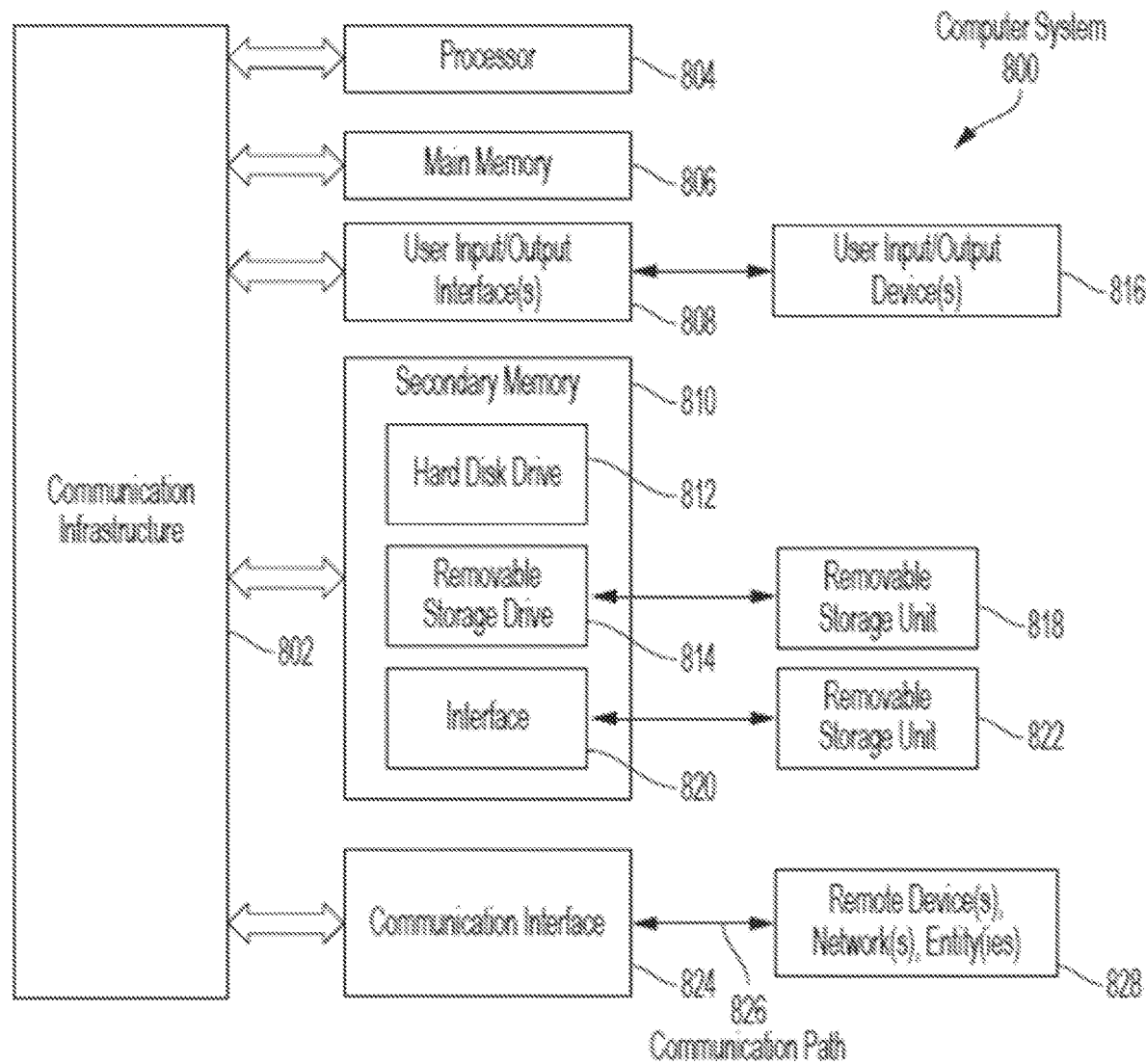
FIG. 5 is a block diagram of various components that any of the computing devices of FIG. 1 or FIG. 2 may include.

Various elements of the systems described above can be implemented, for example, using one or more computer systems, such as computer system 800 shown in FIG. 5. Computer system 800 can be any computer capable of performing the functions described in this document, such as those of the court side machine 101, the external computing device 105, or the player's electronic device 109.

Computer system 800 includes one or more processors (also called central processing units, or CPUs), such as a processor 804. Processor 804 is connected to a communication infrastructure or bus 802. Optionally, one or more of the processors 804 may each be a graphics processing unit (GPU). In various embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 816, such as monitors, keyboards, pointing devices, etc., that communicate with communication infrastructure 802 through user input/output interface(s) 808.

Computer system 800 also includes a main or primary memory 806, such as random access memory (RAM). Main memory 806 may include one or more levels of cache. Main memory 806 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 814 reads from and/or writes to removable storage unit 818 in a well-known manner.

According to an example embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 800, main memory 806, secondary memory 810, and removable storage units 818 and 822, as well as tangible articles of manufacture embodying any combination of the foregoing. Such control logic, when executed by one or more data processing devices (such as computer system 800), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described in this document.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, when terms such as "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document, the term "connected", when referring to two physical structures, means that the two physical structures touch each other. Devices that are connected may be secured to each other, or they may simply touch each other and not be secured.

In this document, the terms "communication link" and "communication path" mean a wired or wireless path via which a first device sends communication signals to and/or receives communication signals from one or more other devices. The term "communicatively connected", when referring to two or more devices or systems, means that a communication path exists between the two components. The terms "transmitter", "receiver", and "transceiver" refer to equipment via which devices may communicate along a communication path. The path may be wired, wireless, or a combination of the two. The path may be a direct path, or an indirect path through one or more intermediary components. The network may include or is configured to include any now or hereafter known communication networks such as, without limitation, a BLUETOOTH® communication network, a Z-Wave® communication network, a wireless fidelity (Wi-Fi) communication network, a ZigBee communication network, a HomePlug communication network, a Power-line Communication (PLC) communication network, a message queue telemetry transport (MQTT) communication network, a MTConnect communication network, a cellular network a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. As such, the network may be configured to implement wireless or wired communication through cellular networks, WiFi, BlueTooth, Zigbee, RFID, BlueTooth low energy, NFC, IEEE 802.11, IEEE 802.15, IEEE 802.16, Z-Wave, Home Plug, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), MQTT, MTConnect, CoAP, REST API, XMPP, or another suitable wired and/or wireless communication method. The network may include one or more switches and/or routers, including wireless routers that connect the wireless communication channels with other wired networks (e.g., the Internet). The data communicated in the network may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, MTConnect protocol, or any other protocol.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for assessing a tennis stroke, the system comprising:
    a sensor device containing one or more sensors capable of detecting parameters of movement of a tennis ball;
    a processor; and
    a memory containing programming instructions that are configured to, when executed, cause the processor to:
        receive, from the one or more sensors, the detected parameters of movement of the ball,
        use the detected parameters to measure linear speed and rotational speed of the ball,
        use the measurements of linear speed and rotational speed to generate a heaviness value for a stroke associated with the movement of the ball, and
        output the heaviness value via a display or speaker.

2. The system of claim 1, wherein the instructions to use the measurements of linear speed and rotational speed to generate the heaviness value comprise instructions to use a function of a translational kinetic energy value and a rotational kinetic energy value of the ball.

3. The system of claim 2, wherein the instructions to use the function of translational kinetic energy and rotational kinetic energy of the ball comprise instructions to:
    adjust the translational kinetic energy value by a first weighting coefficient;
    adjust the rotational kinetic energy energy value by a second weighting coefficient; and
    sum the adjusted translational kinetic energy value and the adjusted rotational kinetic energy value.

4. The system of claim 2, wherein the instructions to generate the heaviness value comprise instructions to, in response to also receiving one or more characteristics of a court from which the sensor device collects data, include the one or more characteristics in the function.

5. The system of claim 1, wherein the instructions to measure linear speed of the ball comprise instructions to, when the one or more sensors comprise a camera:
    measure a distance that the ball has moved in a plurality of subsequent frames captured by the camera; and
    use the measured distance and a frame rate of the camera to determine the linear speed of the ball.

6. The system of claim 1, wherein the one or more sensors comprise a camera, a radar system, a lidar system or an audio sensor.

7. The system of claim 6, wherein the one or more sensors are positioned to detect an area of a tennis court that begins on or before a baseline of the court and extends through and beyond a service line of the court.

8. The system of claim 1, wherein the one or more sensors comprise a receiver configured to receive signals transmitted by a sensor that is located in the ball.

9. The system of claim 1 further comprising instructions to:
    use detected parameters of movement of an additional ball to generate an additional heaviness value for an additional stroke associated with the movement of the additional ball;
    associate each ball's heaviness value with a time stamp indicating a time at which the parameters for that ball were captured; and
    when outputting the heaviness values, use the time stamps of the heaviness values and time stamps of a video showing the strokes to synchronize the heaviness values with the strokes shown in the video.

10. A method of assessing a tennis stroke, the method comprising:
    by a sensor device, detecting parameters of movement of a tennis ball on a tennis court;
    by a processor:
        receiving, from the one or more sensors, the parameters of movement of the ball,
        using the detected parameters to measure linear speed and rotational speed of the ball,
        using the measurements of linear speed and rotational speed to generate a heaviness value for a stroke associated with the movement of the ball, and
        outputting the heaviness value via a display or speaker.

11. The method of claim 10, wherein using the measurements of linear speed and rotational speed to generate the heaviness value comprise using a function of a translational kinetic energy value and a rotational kinetic energy value of the ball.

12. The method of claim 11, wherein using the function of translational kinetic energy and rotational kinetic energy of the ball comprises:
    adjusting the translational kinetic energy value by a first weighting coefficient;
    adjusting the rotational kinetic energy energy value by a second weighting coefficient; and
    summing the adjusted translational kinetic energy value and the adjusted rotational kinetic energy value.

13. The method of claim 11, wherein generating the heaviness value comprises, in response to also receiving one or more characteristics of a court from which the sensor device collects data, including the one or more characteristics in the function.

14. The method of claim 10, wherein measuring linear speed of the ball comprises, when the one or more sensors comprise a camera:
    measuring a distance that the ball has moved in a plurality of subsequent frames captured by the camera; and
    using the measured distance and a frame rate of the camera to determine the linear speed of the ball.

15. The method of claim 10, wherein the one or more sensors comprise a camera, a radar system, a lidar system or an audio sensor.

16. The method of claim 10, wherein detecting the parameters of movement of the tennis ball comprises detecting the parameters on an area of a tennis court that begins on or before a baseline of the court and extends through and beyond a service line of the court.

17. The method of claim 10, wherein:

the one or more sensors are located in the ball; and receiving, from the one or more sensors, the parameters of movement of the ball comprises receiving signals transmitted from the ball.

18. The method of claim 10 further:

using detected parameters of movement of an additional ball to generate an additional heaviness value for an additional stroke associated with the movement of the additional ball;

associating each ball's heaviness value with a time stamp indicating a time at which the parameters for that ball were captured; and when outputting the heaviness values, using the time stamps of the heaviness values and time stamps of a video showing the strokes to synchronize the heaviness values with the strokes shown in the video.

19. A computer program product comprising a computer readable medium containing programming instructions that are configured to cause a processor to:

receive, from the one or more sensors, parameters of movement of a tennis ball on a tennis court;

use the detected parameters to measure linear speed and rotational speed of the ball;

use the measurements of linear speed and rotational speed to generate a heaviness value for a stroke associated with the movement of the ball; and output the heaviness value via a display or speaker.

\* \* \* \* \*